US007145476B2

(12) United States Patent

Beckwith et al.

(10) Patent No.: US 7,145,476 B2

(45) Date of Patent: Dec. 5, 2006

(54) 2-WIRE PUSH BUTTON STATION CONTROL SYSTEM FOR A TRAFFIC LIGHT CONTROLLED INTERSECTION

(75) Inventors: Leslie A. Beckwith, La Mirada, CA (US); Randy V. Cruz, La Habra, CA (US)

(73) Assignee: Polara Engineering, Inc., Fullerton, CA (US)

( * ) Notice: Subject to any disclaimer, the term of this patent is extended or adjusted under 35 U.S.C. 154(b) by 240 days.

(21) Appl. No.: 10/911,655

(22) Filed: Aug. 5, 2004

(65) Prior Publication Data

US 2006/0028357 A1 Feb. 9, 2006

(51) Int. Cl.

| | |
|---|---|
| ***G08B 1/095*** | (2006.01) |
| ***H04B 3/36*** | (2006.01) |
| ***G01S 15/00*** | (2006.01) |

(52) U.S. Cl. .................... 340/944; 340/407.1; 367/116

(58) Field of Classification Search ................ 340/944, 340/407.1, 392.1–396.1, 384.3; 367/116; 704/721; 166/205, 172

See application file for complete search history.

(56) References Cited

U.S. PATENT DOCUMENTS 3,886,496 A * 5/1975 Spilo et al. ................. 340/917
4,253,083 A * 2/1981 Imamura .................... 340/944
4,590,474 A * 5/1986 Patterson et al. ........... 340/944
4,851,836 A * 7/1989 Wilkinson et al. .......... 340/944
5,103,223 A * 4/1992 Humphrey .................. 340/944
5,241,307 A * 8/1993 Bidault et al. .............. 340/944
6,127,943 A * 10/2000 Tauchi et al. ............... 340/944
6,340,936 B1 * 1/2002 McGaffey et al. .......... 340/944

* cited by examiner

*Primary Examiner*—Daniel Wu
*Assistant Examiner*—Jennifer Mehmood
(74) *Attorney, Agent, or Firm*—Morland C. Fischer

(57) ABSTRACT

A 2-wire control system which communicates with a plurality of pole mounted push button stations of the kind that are found at a traffic light controlled intersection via existing pairs of underground wires over which power and data signals are transmitted so as to enable a visually impaired pedestrian to receive both audible and tactile signals regarding the flow of vehicular traffic through the intersection. The 2-wire control system includes a central control unit that is located at a traffic light control cabinet and is connected to a standard traffic signal light controller. The control unit includes a plurality of 2-wire output ports that are connected to respective pairs of the plurality of push button stations. The central control unit also includes a corresponding plurality of on/off controls and data interfaces by which each of the 2-wire output ports thereof is provided with the power and data signals to be transmitted to respective pairs of push button stations depending upon the entry of a pedestrian request and the illumination of a WALK or DON'T WALK message.

21 Claims, 5 Drawing Sheets

2 WIRE CENTRAL CONTROL UNIT 14

2 WIRE PUSH BUTTON STATION 1-1

2-WIRE PUSH BUTTON STATION CONTROL SYSTEM FOR A TRAFFIC LIGHT CONTROLLED INTERSECTION

BACKGROUND OF THE INVENTION

1. Field of the Invention

This invention relates to a 2-wire control system which communicates with pole mounted push button stations of the kind found at a traffic light controlled intersection via existing pairs of underground wires over which power and data signals are transmitted to enable a visually impaired pedestrian to receive both audible and tactile signals in response to depressing a push button head at a push button station when it is intended for the pedestrian to cross the intersection once vehicular traffic has been halted.

2. Background Art

It has long been known to combine a visual display with a series of traffic lights that are located at an intersection to control vehicular traffic and thereby enable pedestrians to enter the intersection once vehicular traffic has been halted. That is to say, the usual visual display conveys both a written message (i.e., WALK or DON'T WALK) as well as a color sensitive message (i.e., red, green or white) to instruct pedestrians when to cross the intersection. However, such visual warnings are of little value to those pedestrians who are visually impaired. Consequently, a visually impaired pedestrian who activates the push button of a traffic signal will have no way to accurately know when the intersection has been cleared of traffic so that it is time to cross.

In order to come into compliance with federal guidelines, such as the Americans With Disabilities Act, cities are required to increase the number of accessible signals that are available to pedestrians at the pole mounted push button stations associated with a traffic light controlled intersection. In particular, to accommodate the needs of visually impaired pedestrians, audible and/or tactile signals are generated at each push button station by which an audible message, a vibration, or the like, is generated when a push button is depressed by one wishing to cross an intersection. In this way, not only will the usual visual message be displayed to sighted pedestrians, but other sensory messages will also become available to coincide with the aforementioned visual message so as to alert visually impaired pedestrians when it is time to cross the intersection after the signal light has changed to halt vehicular traffic.

In the past, the pedestrian accessible signaling means has typically been powered at each corner of an intersection by the 115 VAC available at each existing pedestrian lighted sign. Although this approach does not require that additional wires be pulled from each push button station to the traffic control cabinet, the resulting disadvantage is that each push button station operates independently of the others so that sounds cannot be coordinated or synchronized for optimum audible and vibro-tactile presentation to visually impaired pedestrians.

The labor costs and the interruption in both vehicular and pedestrian movement at each intersection can be significant as a result of having to install new underground wiring to the push button stations in order to enable the additional signal function to be generated and made accessible to visually impaired pedestrians following the depression of a push button. However, most intersections already contain previously installed pairs of wires that run underground from the existing push button stations to a remote traffic light control box.

In this regard, cost sensitive cities would be able to avoid many of the expenditures and inconveniences of having to pull additional wires or even dig trenches and lay new field wires in order to install the new push button stations for each intersection if a control system were available that could incorporate the existing underground wire pairs to transmit power and data signals in order to generate the accessible signal functions for both sighted and visually impaired pedestrians.

Reference may be made to U.S. Pat. No. 5,241,307 issued Aug. 31, 1993 for a microprocessor operated sound signaling and optical signaling generation device that is activated by means of a pedestrian depressing a push button at a traffic light controlled intersection.

SUMMARY OF THE INVENTION

Disclosed herein is a 2-wire push button station control system by which pole mounted push button stations that are located at a traffic light controlled intersection are provided with visual, audible and tactile accessible signals to enable both sighted and visually impaired pedestrians to receive information concerning the status of the intersection to be crossed once vehicular traffic has been halted. A pair of pole mounted push button stations located at opposite sides of a crosswalk are connected to a central control unit at a traffic light control cabinet via the same pair of wires. The central control unit is connected to a conventional traffic light controller so that the traffic lights which control access to the intersection can be cycled and the usual WALK or DON'T WALK visual messages displayed in response to pedestrian requests that are entered at the push buttons of the push button stations. The pairs of wires of the 2-wire push button station control system of this invention for connecting the push button stations to the central control unit are, in the preferred embodiment, the existing underground wires that were previously installed for the purpose of connecting the heretofore conventional push buttons to a traffic light control cabinet. In this manner, cities can advantageously minimize labor costs and interruptions in pedestrian and vehicular movements by not having to pull additional wires or dig trenches and lay new pairs of wires when the new push button stations are installed.

The central control unit of the 2-wire push button control system includes a microcontroller that is responsive to pedestrian requests that are entered at the push button stations and controls the voltage at a plurality of 2-wire output ports of the control unit which are interconnected with respective ones of the push button stations. An on/off control and a data interface are connected between the microcontroller and respective ones of the 2-wire output ports of the control unit to enable both power and data signals to be transmitted between the control unit, at an output port thereof, and a corresponding push button station.

Each on/off control of the central control unit includes a (e.g., transistor) switch which, during normal system operation, is closed to supply a 24 volt DC signal from a power supply to one of the push button stations from a corresponding one of the 2-wire output ports of the control unit. Each on/off control also includes current and voltage monitoring means by which to cause the switch to open and thereby disconnect the output port from the voltage supply in the event that the operating voltage or current of the 2-wire push button control system should exceed predetermined limits.

Each data interface of the central control unit includes a driver H-bridge and a transformer that is located between the driver and a corresponding one of the 2-wire output ports of the central control unit so that a serial stream of data pulses (lying in a range of voltages between 0 and 48 volts DC) can be provided to a respective one of the push button stations depending upon the pedestrian requests that are entered at the push button station. A receiver is coupled to the primary winding of the transformer to detect the output voltage of the transformer. The driver H-bridge and the receiver cooperate with one another to enable the microcontroller to control the output voltage of the driver which is transmitted through the transformer as digital data at the corresponding 2-wire output port.

Each pole mounted push button station includes a microcontroller which is responsive to a pedestrian request that is entered by depressing a push button head having a coil and a magnet. The microcontroller controls the operation of a vibration driver and a sound chip so that both tactile and audible pedestrian accessible signals are available at each push button head. That is, the sound chip stores prerecorded messages that are particularly useful to a visually impaired pedestrian to indicate the status of the intersection to be crossed. In this same regard, the vibration driver generates a magnetic field for causing the push button head to vibrate at the same time that the usual WALK signal is displayed to sighted pedestrians.

DETAILED DESCRIPTION

Figure 1:
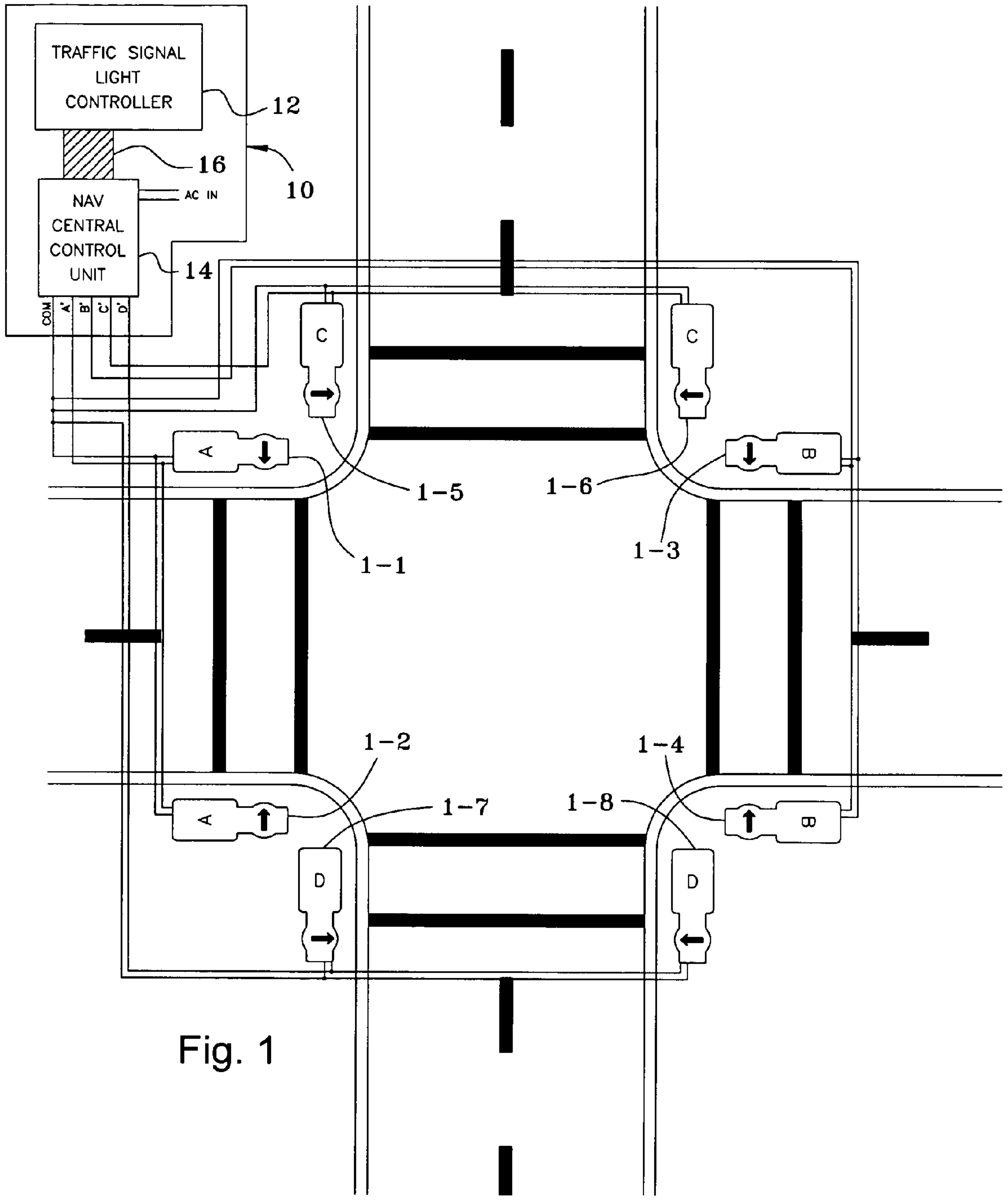
FIG. 1 shows a 4-way traffic light controlled intersection and eight pedestrian activated, pole mounted push button stations connected to a traffic light control cabinet via pairs of underground wires over which power and data signals are transmitted.
Figure 2:
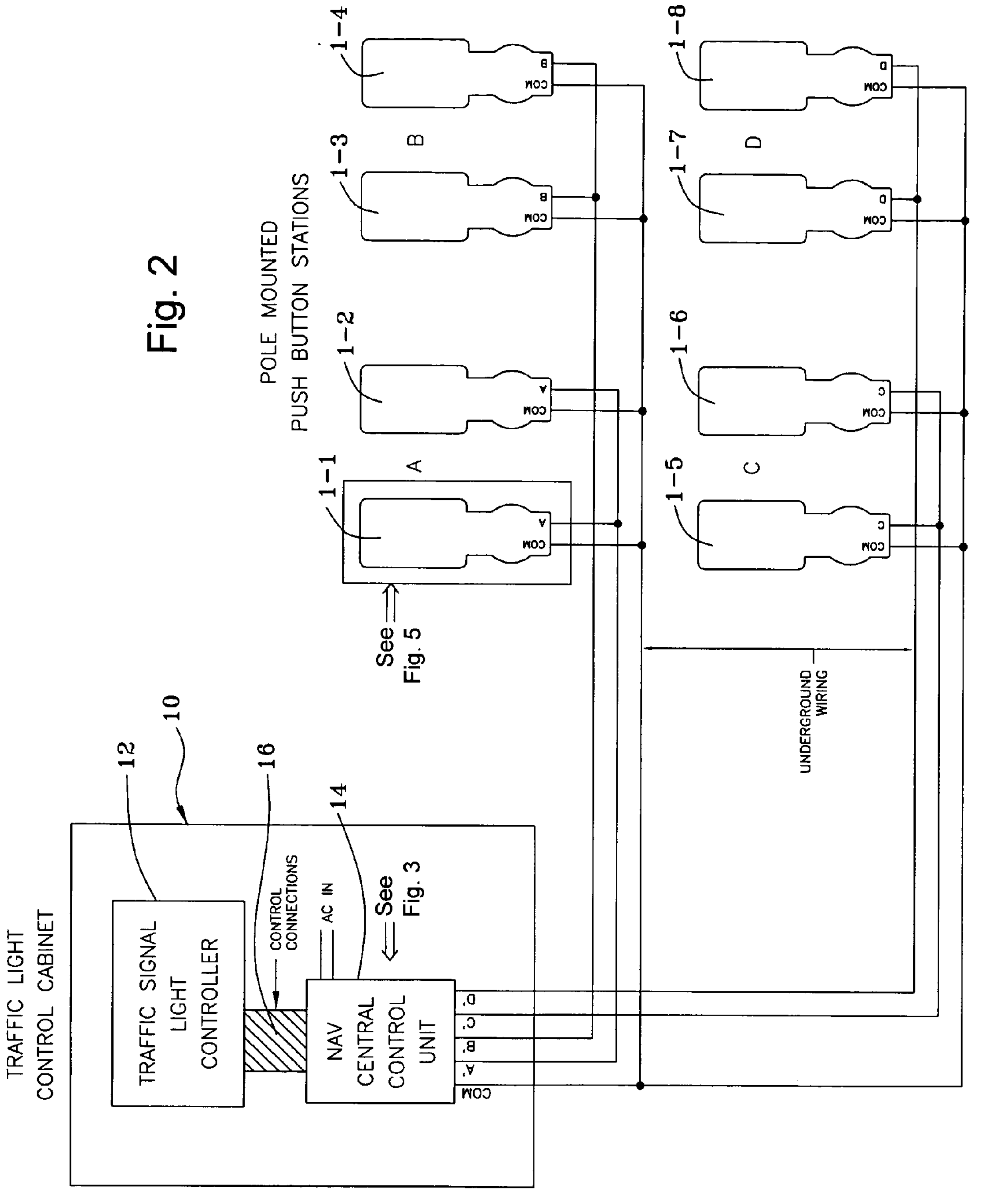
FIG. 2 illustrates the underground wire run between the eight pedestrian activated push button stations of FIG. 1 and the remote traffic light control cabinet.

FIGS. 1 and 2 of the drawings illustrate a 4-way traffic light controlled intersection having eight (e.g., pole mounted) push button stations 1-1 . . . 1-8 located at opposite sides of four crosswalks, designated A, B, C and D, and traffic light control hardware located at a traffic light control cabinet 10 and interconnected to the push button stations via existing (i.e., previously laid) push button wiring that typically runs underground. Although the four pairs of push button stations illustrated in FIGS. 1 and 2 are installed for a standard 4-way traffic light controlled intersection, where one push button station is located at each end of a crosswalk for controlling the flow of vehicular traffic, it is to be understood that a different number of push button stations for complex intersections or intersections with pedestrian islands may also be used to provide audible and tactile information by which to enable both sighted and visually impaired pedestrians to cross an intersection once vehicular traffic has been halted.

Each of the push button stations 1-1 . . . 1-8 of FIGS. 1 and 2 is intended to replace a conventional push button of the kind having a pair of normally open electrical switch contacts that are closed in response to a pushing force that is manually applied to a pole mounted push button. However, to advantageously reduce the labor and cost of installing the push button stations of the present invention, the existing two wires that run underground from each of the conventional push buttons is preserved and reused for connecting each pair of push button stations 1-1 and 1-2 . . . 1-7 and 1-8 from crosswalks A–D in electrical parallel to traffic light control cabinet 10 for transmitting power and data signals therebetween.

The remote traffic light control cabinet 10 to which a pair of wires is connected from each crosswalk A–D of the pole mounted push button stations 1-1 . . . 1-8 includes a conventional traffic signal light controller 12. As will be understood by those skilled in the art, the controller 12 is adapted to recognize the activation (i.e., depression) of one of the push button heads (designated 80 in FIG. 5) in response to a pedestrian request so as to operate the traffic light which controls traffic and pedestrian access to the intersection. The traffic light control cabinet 10 also includes a 2-wire central control unit 14 that is connected to the traffic signal light controller 12 by a bundle of control connections 16.

Control unit 14 as well as the push button stations 1-1 . . . 1-8 are powered by a 115 volt AC line voltage. As will be explained in greater detail when referring to FIG. 3, the central control unit 14 applies pedestrian requests entered at the push button stations 1-1 . . . 1-8 on crosswalks A–D to the traffic signal light controller 12 so as to generate tactile, audible and visual signals which inform both sighted and visually impaired pedestrians when to WALK or DON'T WALK into the crosswalks of the traffic light controlled intersection. As will also be explained when referring to FIG. 3, the central control unit 14 is connected to the underground push button wiring at 2-wire output ports, designated A', B', C' and D'. In this same regard, the control unit 14 includes a common (i.e., ground) port for connection to one line which is common to each of the push button stations 1-1 . . . 1-8.

Figure 3:
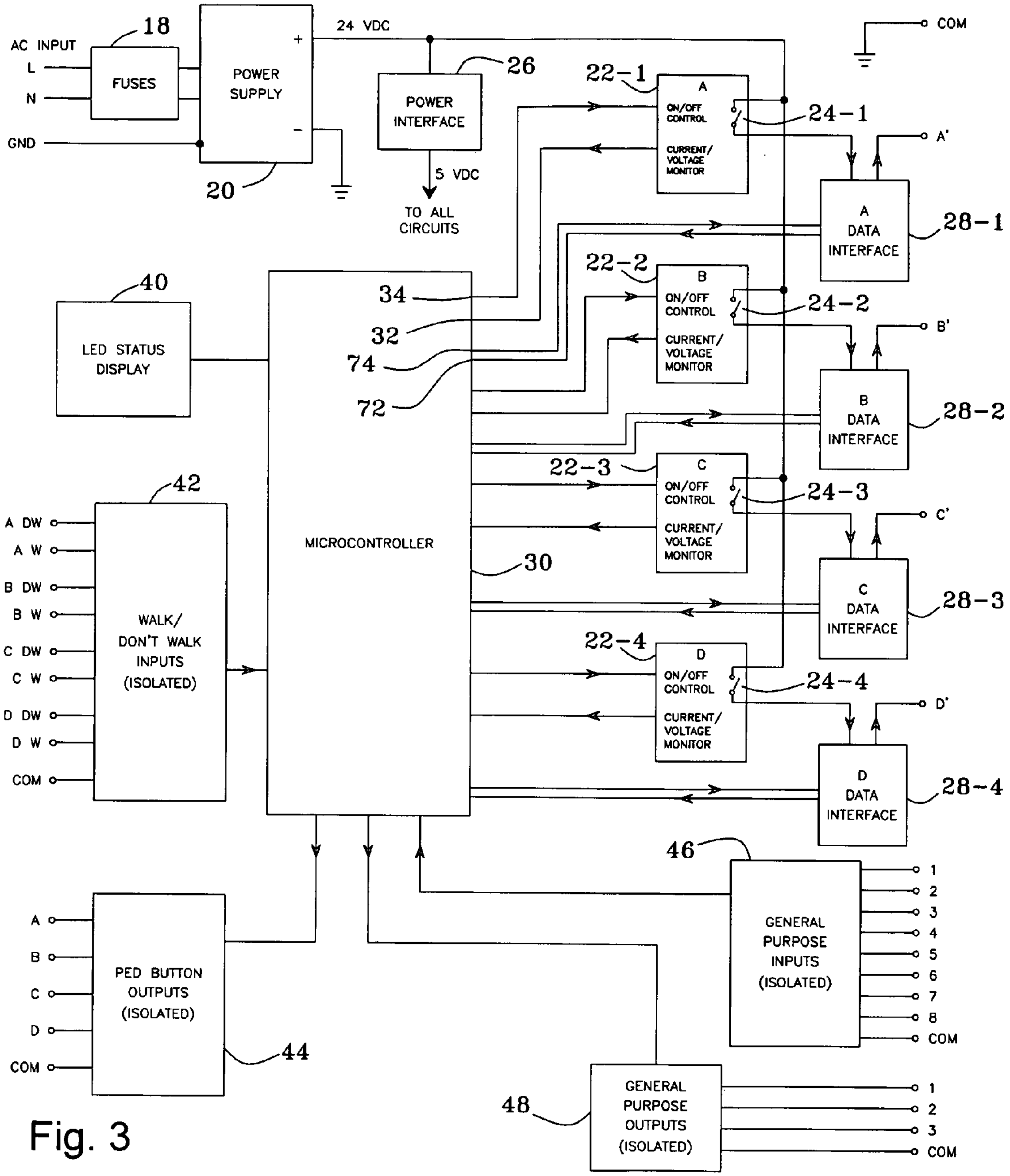
FIG. 3 is a block diagram showing a 2-wire central control unit of the traffic light control cabinet connected to the push button stations via the underground wire run of FIGS. 1 and 2.

Turning now to FIG. 3 of the drawings, there is shown a block diagram that is illustrative of the 2-wire central control unit 14 within the traffic light control cabinet 10 of FIGS. 1 and 2. As previously described, the central control unit 14 is powered by a 115 volt signal that is applied to a conventional power supply 20 via fuses 18. The power supply 20 converts the AC input signal to a 24 volt DC output signal. The 24 volt DC output signal is applied from the power supply 20 to one terminal of each of a plurality of electronic (e.g., MOSFET transistor) switches 24-1 . . . 24-4 that are associated with a respective plurality of on/off controls 22-1 . . . 22-4. The number (e.g., four) of on/off controls 22-1 . . . 22-4 of the central control unit 14 is equal to the number of crosswalks A–D in FIGS. 1 and 2 to be controlled and the corresponding number of pairs of push button stations 1-1 and 1-2 . . . 1-7 and 1-8 located at the opposite ends of each crosswalk. The 24 volt DC output signal from power supply 20 is also applied to a power interface 26 where the 24 volt DC signal is converted to a 5 volt DC output signal for powering the remaining circuitry of central control unit 14.

As will be explained when referring to FIG. 4, the on/off controls 22-1 . . . 22-4 provide current and voltage monitoring means. When any of the transistor switches 24-1 . . . 24-4 of the on/off controls 22-1 . . . 22-4 is closed under normal operating conditions, a 24 volt DC signal will be applied by way of a respective data interface 28-1 . . . 28-4 to a corresponding one of the 2-wire output ports A', B', C' or D' of the central control unit 14 to which reference was previously made when referring to FIGS. 1 and 2. As will also be explained when referring to FIG. 4, the data interfaces 28-1 . . . 28-4 include transformers that are adapted to drive respective output ports A'-D' to a voltage lying in a range of voltages between 0 to 48 volts DC corresponding to a set of information coded pulses.

The 2-wire central control unit 14 at the traffic light control cabinet 10 of FIGS. 1 and 2 is controlled by a suitable microcontroller 30, such as that manufactured by Microchip Technology of Phoenix, Ariz. under Part No. PIC 18F452. A pair of pins (e.g., designated 32 and 34) of the microcontroller 30 is dedicated to each of the on/off controls 22-1 . . . 22-4. One of the pins 32 that is connected to a first on/off control 22-1 receives an indication of the voltage at a first of the output ports A' associated with a first of the push button stations A of the traffic light controlled intersection. The first on/off control 22-1 checks for a system fault condition at output port A' of central control circuit unit 14. That is, in any case where the voltage at output port A' is not 24 volts DC (at a maximum of 5 amps), the microcontroller 30 generates a signal at pin 34, whereby to cause the transistor switch 24-1 to open and thereby interrupt the circuit connection between power supply 20 and the output port A'. The voltage at output port A' in this case drops to 0. Additional pairs of pins of the microcontroller 30 are dedicated to similar fault monitoring functions with respect to output ports B', C' and D' of central control unit 14 by opening the corresponding switches 24-2, 24-3 and 24-4 of respective on/off controls 22-2, 22-3 and 22-4 depending upon predetermined voltage and current monitoring conditions to be described while referring to FIG. 4.

The central control unit 14 at the traffic control cabinet 10 of FIGS. 1 and 2 also includes an LED status display 40 which is connected to the microcontroller 30. Display 40 has a bank of light emitting diodes to indicate to workmen in the field the status of each input and output to the microcontroller 30 so as to verify normal system operation as well as fault condition in need of repair.

The central control unit 14 further includes a set of pedestrian output terminals 44 that are connected between the microcontroller 30 and the traffic signal light controller (designated 12 in FIGS. 1 and 2). The set of pedestrian output terminals 44 provides output signals that are responsive to the pedestrian requests entered at the push button stations 1-1 . . . 1-8 at the crosswalks A–D. The set of output terminals 44 may include a corresponding set of (e.g., four) relays which are operated by the microcontroller 30 to duplicate the push button functions performed by pedestrians at the push button stations 1-1 . . . 1-8.

The central control unit 14 also includes four pairs of parallel connected DON'T WALK/WALK input terminals 42 (designated DW and W) for the four pairs of push button stations at crosswalks A–D that are interfaced with the traffic signal light controller 12 (also located at the traffic control cabinet 10 of FIGS. 1 and 2) via connections 16. Each time a pedestrian activates one of the push button stations 1-1 . . . 1-8 at a crosswalk A–D, the event is transmitted through one of the pedestrian output terminals 44 to the traffic signal light controller 12. The traffic signal light controller 12 initiates the timing sequence by which a WALK or DON'T WALK visual signal will be illuminated to pedestrians at crosswalks A–D. The voltage to illuminate the pedestrian visual signals is supplied to one of the input terminals 42 to be converted to 5 volts DC and then applied to the microcontroller 30. Thus, the central control unit 14 receives its timing from the WALK and DON'T WALK signals.

To maximize the versatility of the central control unit 14 to accomplish a variety of applications now and in the future, a set of optional general purpose terminals 46 are connected to the microcontroller 30 to selectively control the functions relating to the audible, visual and tactile signals to be supplied to the push button stations 1-1 . . . 1-8. Such general purpose terminals may provide (e.g., 24 volt DC) input signals to the microcontroller 30 for such purposes as, for example, to vary the volume of the audible signal or the length of a tactile vibration that is accessible to a pedestrian following his activation of a push button station 1-1 . . . 1-8 in order to cross an intersection.

In this same regard, and to further maximize the versatility of the control unit 14, a set of optional general purpose output terminals 48 are also connected to the microcontroller 30. In this case, the microcontroller 30 is programmed to provide output signals which, for example, may trigger a flashing device, or some other external event (e.g., a relay), for a predetermined length of time to maximize pedestrian awareness as to the status of vehicular traffic with respect to the intersection to be entered.

Figure 4:
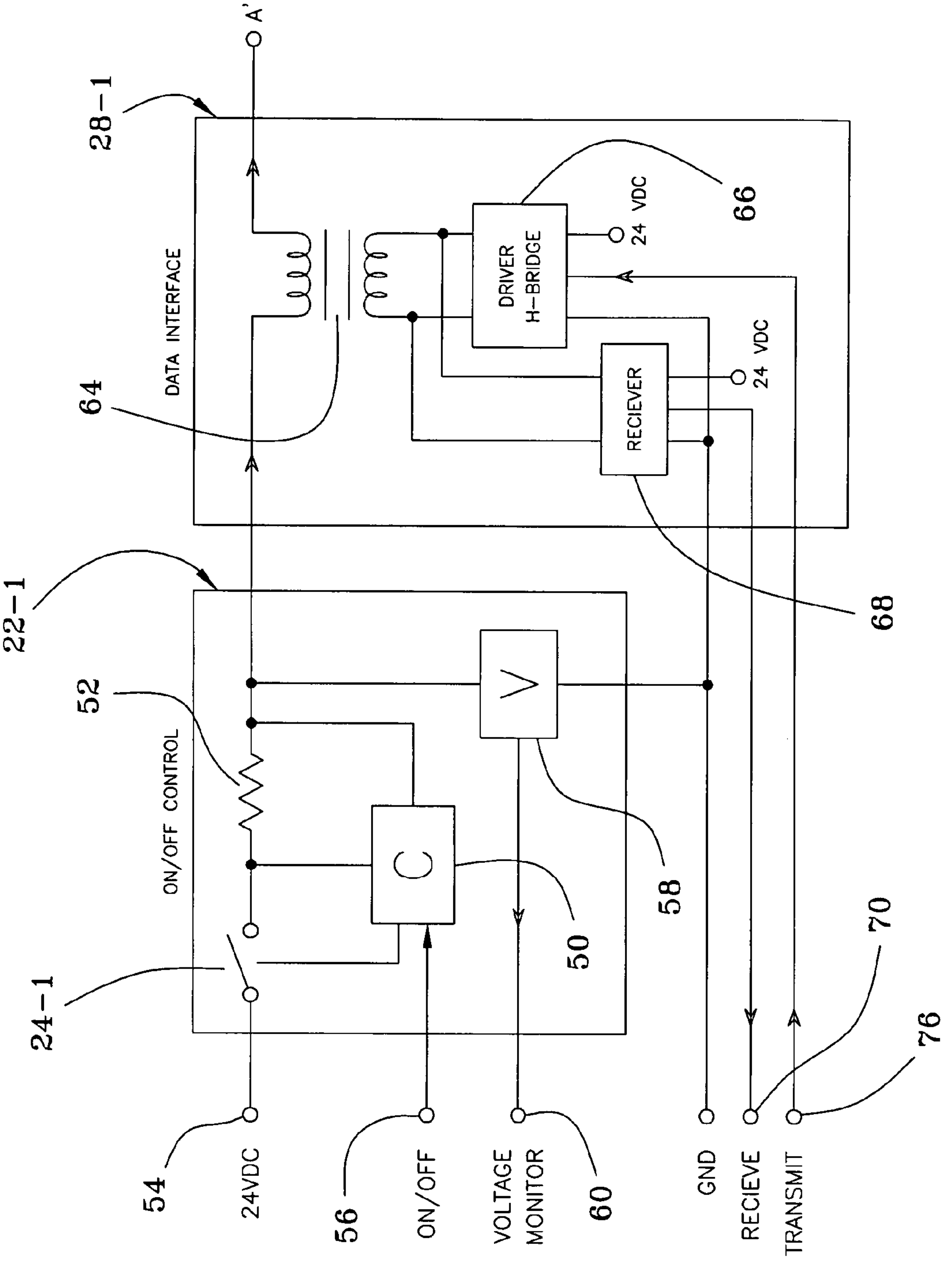
FIG. 4 is a block diagram to detail the interconnection of an on/off control and a data interface of the central control unit of FIG. 3 to generate a voltage at an output port thereof to be supplied to a corresponding one or more of the push button stations of FIGS. 1 and 2.

Turning now to FIG. 4 of the drawings, there is shown a block diagram for an on/off control and a data interface (designated 22-1 and 28-1) that are connected between the microcontroller 30 and one output port (designated A') of the central control unit 14 FIG. 3. The four on/off controls 22-1 . . . 22-4 and data interfaces 28-1 . . . 28-4 of control unit 14 are identical. Therefore, for purposes of convenience, only one on/off control 22-1 and data interface 28-1 will be described in detail while referring to FIG. 4.

As previously described, each on/off control 22-1 of the central control unit 14 includes an electronic (e.g., MOSFET transistor) switch 24-1 that is connected to a power supply (designated 20 in FIG. 3) to receive a 24 volt DC input signal. As also described, the on/off control 22-1 has current and voltage monitoring means to ensure the normal operation of the 2-wire control system. More particularly, a current monitoring and limiting circuit 50 is responsive to the current flowing through a current shunting resistor 52 to control the gate voltage of transistor switch 24-1. Resistor 52 is connected in electrical series with switch 24-1 and a 24 VDC input terminal 54 of the on/off control 22-1.

During normal operation, a 5 volt DC control signal is supplied from a pin (designated 34 in FIG. 3) of the microcontroller 30 to the current monitoring and limiting circuit 50 at a transistor ON/OFF control terminal 56 of the on/off control 22-1 of central control unit 14. Accordingly, the current monitoring and limiting circuit 50 causes the switch 24-1 to be closed (i.e., turned on), whereby the first output port A' of control unit 14 is provided with an output signal of approximately 24 volts DC to be supplied to the first pair of push button stations 1-1 and 1-2 at a first crosswalk (designated A in FIGS. 1 and 2). In the event that the input current flowing through resistor 52 exceeds a predetermined maximum level (e.g., 5 amps), the current monitoring and limiting circuit 50 causes the resistance of transistor switch 24-1 to increase, whereby the output voltage of the central control unit 14 at the output port A' thereof is correspondingly reduced, an indication of which is transmitted to the first pair of push button stations 1-1 and 1-2.

A conventional voltage monitoring device 58 (e.g., a voltage divider network) is responsive to voltage changes at the output terminal A' of data interface 28-1. That is, the voltage monitoring device 58 supplies an analog signal to a pin (designated 32 in FIG. 3) of the microcontroller 30 from a VOLTAGE MONITOR output terminal 60 of on/off control 22-1. In the event that the voltage at output terminal A' falls below 24 volts DC, the control signal supplied to the transistor ON/OFF control terminal 56 from pin 34 will now be at 0 volts. Accordingly, the current monitoring and limiting circuit 50 will cause the switch 24-1 to be opened (i.e., turned off), with the result that the output voltage of central control unit 14 at output port A' will drop to 0 volts by which to signify a malfunction.

The data interface 28-1 includes a conventional transformer 64 that is coupled to the output port A' of central control unit 14 in order to supply the first pair of push button stations 1-1 and 1-2 at the first crosswalk (designated A in FIGS. 1 and 2) with both data and 24 volt DC power signals. The primary winding of transformer 64 is connected to a driver H-bridge 66. As will be recognized by those skilled in the art, driver 66 functions as a transmitter by which to enable the transformer 64 to produce a series of coded data pulses corresponding to output voltages which lie in a range of voltages between 0 and 48 volts DC depending upon whether a pedestrian has activated one of the corresponding pair of push button stations 1-1 or 1-2 at crosswalk A.

The input to a receiver 68 is connected across the primary winding of transformer 64. In this case, the receiver 68 functions as an electronic comparator so as to compare the magnitude of the voltage at the two output terminals of the transformer 64 as the coded data pulses change. To this end, the output of receiver 68 is connected through a RECEIVE data terminal 70 of data interface 28-1 to provide a data signal (e.g., 5 volts DC or 0 volts) to a corresponding pin (designated 72 in FIG. 3) of the microcontroller 30. An additional pin (designated 74 in FIG. 3) of microcontroller 30 is connected through a TRANSMIT data terminal 76 of data interface 28-1 to provide a data signal to an input of the driver H-bridge 66 to control the operation thereof for driving the output port A' of central control unit 14 above or below 24 volts DC to create a string of information coded pulses. Accordingly, it may be appreciated that the driver H-bridge 66 and the receiver 68 cooperate with one another to form a receiver-transmitter pair to control the output voltage of central control unit 14 at the output port A' thereof to be supplied from control unit 14 to the first pair of push button stations 1-1 and 1-2 in response to the requests entered by a pedestrian wishing to cross an intersection that is controlled by the push button stations of crosswalk A.

Figure 5:
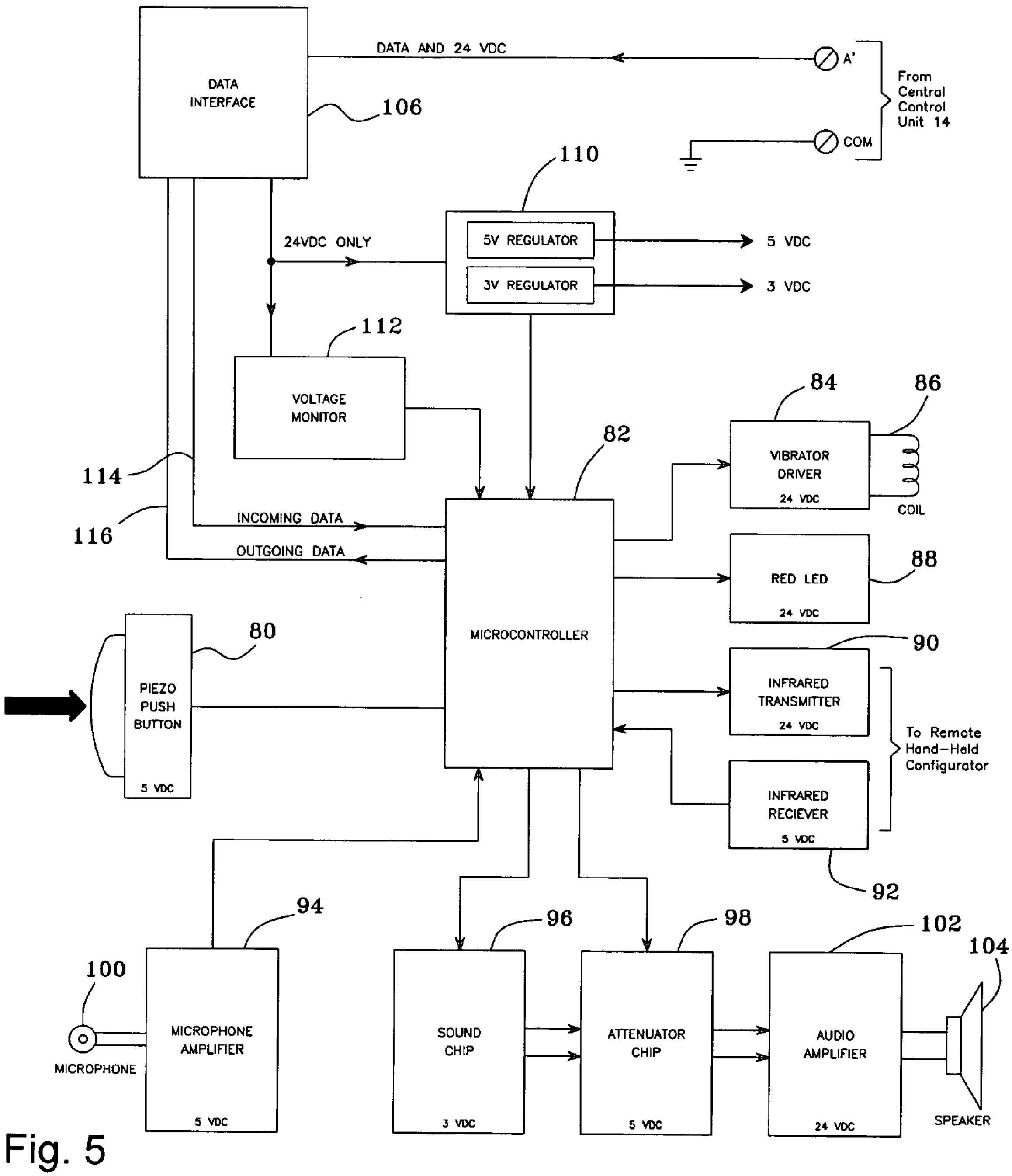
FIG. 5 is a block diagram to detail one of the pedestrian activated push button stations of FIGS. 1 and 2 to receive both audible and tactile pedestrian accessible signals.

FIG. 5 is a block diagram to illustrate one of the pair of 2-wire push button stations (e.g., designated 1-1 in FIG. 2) from a first crosswalk A, whereby audible and tactile messages are accessible to visually impaired pedestrians following a depression of a vibrating push button head 80. Push button head 80 includes a magnet and a coil to generate a tactile feedback signal (e.g., a vibration) by which to inform a visually impaired pedestrian when to cross the intersection of FIG. 2 that is controlled by the push button station 1-1. Reference may be made to patent application Ser. No. 10/749,848 filed Jan. 2, 2004 for a detailed explanation of a vibrating push button head 80 that is suitable for use within the push button station 1-1 of FIG. 5.

Push button head 80 is connected to a microcontroller 82 so as to provide a digital code thereto to indicate a pedestrian request when push button head 80 is depressed and released. By way of example, the microcontroller 82 that is used in push button station 1-1 is manufactured by Microchip Technology under Part No. PIC18F252. The microcontroller 82 is programmed to energize a vibration driver 84 a certain time after the request of a pedestrian at the push button head 80 to coincide with the usual illumination of a visual signal (e.g., WALK) that is provided to sighted pedestrians. The vibration driver 84 includes a coil through which a current will flow to create a magnetic field for the purpose of causing a corresponding vibration that can be felt by a pedestrian whose hand rests against the push button head 80.

The microcontroller 82 of push button 1-1 is also programmed to cooperate with an indicator light 88, an infrared transmitter 90 and an infrared receiver 92. The indicator light (e.g., a red LED) is illuminated to provide a visual indication to sighted pedestrians that the push button head 80 has been depressed so as to initiate the traffic light sequence to halt vehicular traffic. The infrared transmitter and receiver 90 and 92 are optional devices to be used to communicate with a remote hand held configurator (not shown) by which to change the operational options of the microcontroller 82. That is, the remote configurator may be a wireless device that links to the infrared transmitter and receiver 90 and 92 so as to enable configuration changes to be implemented by remote control by workmen in the field during installation and maintenance procedures.

The microcontroller 82 of push button 1-1 is coupled to each of a microphone amplifier 94, a sound chip 96, and an attenuation chip 98. The microphone amplifier 94 is interfaced with a microphone 100 which is capable of listening for ambient noise in the vicinity of push button station 1-1. Microcontroller 82 processes an analog signal from the microphone amplifier 94 which is indicative of the background noise generated by traffic and individuals at the intersection being controlled by push button station 1-1 at crosswalk A. Prerecorded information is stored in a digital format in the sound chip 96. In the present embodiment, the sound chip 96 functions as a digital tape recorder that emits an audible sound or a verbal message (e.g., WALK) to pedestrians following the activation of push button head 80. The microcontroller 82 causes an appropriate stored message to be played at the appropriate time depending upon vehicular traffic conditions and the pedestrian's request.

The sound chip 96 is interfaced with the attenuation chip 98, an audio amplifier 102, and a speaker 104. The attenuation chip 98 provides digital volume control and is capable of adjusting the volume of the audible verbal message to be emitted by sound chip 96. The volume of the message is adjusted depending upon the analog signal that is transmitted to microcontroller 82 by the microphone amplifier 84 in response to the background ambient noise detected by microphone 100. A volume controlled audible signal is supplied to the audio amplifier 102 which drives the speaker 94 so that the prerecorded sound or message stored in the sound chip 96 will be accessible to a visually impaired pedestrian about to enter crosswalk A so as to verbally alert him to the status of vehicular traffic at the intersection controlled by push button station 1-1.

The push button station 1-1 also includes a data interface 106. Data interface 106 is identical to the data interface (designated 28-1) of the 2-wire central control unit 14 that was previously described when referring to FIGS. 3 and 4. Therefore, the data interface 106 of push button 1-1 includes a transformer and a receiver/transmitter pair (like those designated 64, 66 and 68 in FIG. 4), as previously described. The data interface 106 receives both input digital data (i.e., the coded data pulses) from the data interface 28-1 of FIG. 4 and 24 volt DC power signals from the on/off control 22-1 of FIG. 4 via the corresponding 2-wire output port A' of the central control unit 14 (best shown in FIGS. 1 and 2). The input data supplied to push button station 1-1 from central control unit 14 typically initiates the WALK, flashing DON'T WALK, and DON'T WALK visual messages to pedestrians. In this regard, the coded data pulses could be superimposed (i.e., multiplexed) over the power signals. Data interface 106 provides a 24 volt DC output signal to a power regulator 110. Power regulator 110 provides 5 volt DC and 3 volt DC output signals to power the microcontroller 82 as well as certain ones of the sound and vibration emitting devices shown in FIG. 5 as part of the 2-wire push button station 1-1.

The data interface 106 is connected to a voltage monitor 112. Voltage monitor 112 monitors the power signals that are supplied to the 2-wire push button station 1-1 from the on/off control 22-1 (of FIG. 4) via the 2-wire output port A' of central control unit 14 and the pair of underground wires illustrated in FIGS. 1 and 2. In the event a threshold voltage indicative of a fault condition is detected, the voltage monitor 112 notifies the microcontroller 82 at an analog pin thereof, whereby the push button station 1-1 is disabled and a record of the fault condition is recorded.

Like the data interface 28-1 of FIG. 4, a pair of pins of the microcontroller 82 of push button station 1-1 are connected to the driver H-bridge and the receiver (not shown) of the data interface 106 over a pair of incoming and outgoing data lines 114 and 116. As previously indicated, a digital data signal (e.g., 0 volts or 5 volts DC) is provided over the incoming data line 114 from the receiver of data interface 106 to a first pin of microcontroller 82 depending upon the output voltage of the transformer like that designated 64 in FIG. 4. Another digital data signal is provided over outgoing data line 116 from a second pin of the microcontroller 82 to the driver H-bridge of data interface 106 to control the output voltage of the driver H-bridge. Accordingly, and as previously described, the driver H-bridge of the data interface 106 functions as a transmitter which communicates with the data interface 28-1 of the central control unit 14 of FIG. 3 to send digital data (e.g., by which to indicate that the push button head 80 of push button 1-1 has been depressed or released) back to control unit 14 at the 2-wire output port A' thereof.

It may, therefore, be appreciated that the 2-wire push button control system herein disclosed uses pairs of underground wires over which both power and data signals are transmitted between the central control unit 14 at the traffic light control cabinet 10 and pairs of pole mounted push button stations 1-1 and 1-2 . . . 1-7 and 1-8 at crosswalks A–D to enable visual (e.g., WALK), tactile (e.g., a vibration), and audible (e.g., a prerecorded message) accessible signals to be available to both sighted and visually impaired pedestrians at a traffic light controlled intersection. In this case, parallel connected inputs (i.e., the WALK/DON'T WALK terminals 42 of FIG. 3) are converted to a serial stream of digital output at the 2-wire output terminals A'–D' of central control unit 14.

We claim:

1. A control system by which vibro-tactile messages are provided to alert pedestrians when to cross a traffic light controlled intersection, said control system comprising:

at least one push button station located at the traffic light controlled intersection to be crossed by pedestrians, said push button station including a push button head that is depressed by the pedestrians and message generating means adapted to cause said push button head to vibrate to provide a tactile indication to a visually impaired pedestrian when to cross the intersection; and a control unit that is responsive to the depression of the push button head of said push button station to transmit to the push button station both power and digital data signals over a single pair of wires by which to power and control the operation of said message generating means.

2. The control system recited in claim 1, wherein said at least one push button station also includes a microcontroller to receive the power and digital data signals from said control unit, said microcontroller providing output signals to control the operation of said message generating means.

3. The control system recited in claim 2, wherein said message generating means of said at least one push button station includes a vibration driver connected to said microcontroller to cause said push button head to vibrate and thereby provide said tactile indication to the visually impaired pedestrian that it is safe to cross the intersection.

4. The control system recited in claim 2, wherein said message generating means of said at least one push button station includes a sound chip in which prerecorded messages are stored and from which an audible indication is provided to the visually impaired pedestrian whether to enter the intersection depending upon the flow of vehicular traffic therethrough.

5. The control system recited in claim 1, wherein said message generating means of said at least one push button station also includes:

a microphone connected to the microcontroller and responsive to the ambient noise in the vicinity of the push button station;

a speaker through which the prerecorded messages stored in said sound chip are emitted to pedestrians; and an attenuation chip connected to the microcontroller and adapted to vary the volume of the prerecorded messages that are stored in said sound chip and emitted by said speaker depending upon the ambient noise detected by said microphone.

6. The central control system recited in claim 1, wherein said control unit includes a 2-wire output port to which said single pair of wires is connected from said at least one push button station, said power and digital data signals being transmitted from said control unit to said push button station over a first of said pair of wires, and the second of said pair of wires being connected to ground.

7. The control system recited in claim 6, wherein said control unit includes a power supply, an electronic switch that is closed to connect said power supply to said 2-wire output port to provide power signals to said at least one push button station over the first of said pair of wires connected to said 2-wire output port, and fault detection means by which to cause said electronic switch to open and said power supply to be disconnected from said 2-wire output port in the event said fault detecting means detects a fault condition in the operation of said control unit.

8. The control system recited in claim 7, wherein said fault detection means includes a microcontroller and current and voltage monitoring means connected to said microcontroller and responsive to the output of said power supply, said microcontroller causing said electronic switch to open in the event that the output voltage or current of said power supply exceeds predetermined limits.

9. The control system recited in claim 8, wherein said control unit also includes a data interface including a driver and a transformer connected between said driver and said 2-wire output port, said driver generating said digital data signals through said transformer to said 2-wire output port to be transmitted from said control unit to said at least one push button station over the first of said pair of wires connected to said 2-wire output port.

10. The control system recited in claim 9, wherein the data interface of said control unit also includes a receiver connected to said transformer to monitor the digital data signals generated by said driver, said receiver communicating to said microcontroller an indication of the magnitude of the digital data signals generated by said driver, and said microcontroller controlling the digital data signals generated by said driver to said transformer in response to the indication provided by said receiver.

11. A control system by which accessible signals are provided to pedestrians regarding the status of vehicular traffic at a traffic light controlled intersection, said system comprising:

a source of power;

at least one push button station located at the traffic light controlled intersection to be crossed by pedestrians, said push button station including a push button head that is depressed by the pedestrians and message generating means by which to provide at least one accessible message to advise a pedestrian when vehicular traffic through the intersection has been halted; and a control unit connected to said source of power to receive an input signal provided thereby, said control unit being responsive to the depression of the push button head of said push button station to control the operation of said message generating means, said control unit including an on/off control and a data interface, the on/off control of said control unit having means by which to monitor the input signal provided by said source of power, said on/off control connecting said push button station to said source of power to energize said message generating means provided that said input signal is above a predetermined level, and said on/off control disconnecting said push button station from said source of power to disable said message generating means provided that said input signal is below the predetermined level, the data interface of said control unit providing data signals to said push button station to initiate said message generating means.

12. The control system recited in claim 11, wherein each of the on/off control and the data interface of said control unit is connected to said push button station by way of the same electrical conductor.

13. The control system recited in claim 11, wherein said control unit includes a 2-wire output port, said control system further comprising a pair of wires connected between said 2-wire output port and said push button station, the on/off control and the data interface of said control unit connected from said 2-wire output port to said push button station via a first of said pair of wires, and the second of said pair of wires connected to ground.

14. The control system recited in claim 11, wherein the on/off control of said control unit includes an electronic switch connected between said source of power and said push button station, said control unit including a microcontroller adapted to generate control signals to cause said electronic switch to open and close depending upon the level of the input signal provided by said source of power and monitored by said on/off control.

15. The control system recited in claim 14, wherein the input signal monitoring means of said on/off control includes a current shunting resistor connected in electrical series with said electronic switch and a switch control responsive to the current flowing through said current shunting resistor, said switch control causing said electronic switch to open in the event that the current flowing through said current shunting resistor exceeds a predetermined current.

16. The control system recited in claim 15, wherein the input signal monitoring means of said on/off control also includes a voltage monitor connected to said microcontroller and responsive to the voltage of said input signal, said microprocessor generating one of the control signals for causing said electronic switch to open in the event that the voltage to which said voltage monitor is responsive is below a predetermined voltage.

17. The control system recited in claim 14, wherein the data interface of said control unit includes a driver and a transformer, said driver generating said data signals to be provided to said push button station through said transformer.

18. The control system recited in claim 17, wherein said data interface also includes a receiver connected to said transformer and responsive to the data signals generated by said driver through said transformer, said receiver communicating to said microcontroller an indication of the magnitude of said data signals, and said microcontroller controlling the data signals generated by said driver in response to the indication provided by said receiver.

19. The control system recited in claim 11, wherein said push button station includes a microcontroller coupled to each of said on/off control and said data interface of said control unit by which to power said message generating means and initiate said message generating means a certain time after the depression of said push button head.

20. The control system recited in claim 19, wherein the message generating means of said push button station includes a vibration driver connected to said microcontroller to cause said push button head to vibrate and thereby provide a tactile indication to a pedestrian when vehicular traffic through the intersection has been halted.

21. A control system by which messages are provided to alert pedestrians when to cross a traffic light controlled intersection, said control system comprising:

at least one push button station located at the traffic light controlled intersection to be crossed by pedestrians, said push button station including a push button head that is depressed by the pedestrians and a message generator by which to provide at least one message to advise the pedestrians when to cross the intersection; and a control unit responsive to the depression of the push button head of said push button station to transmit to the push button station power and digital data signals over a single pair of wires by which to power and control the operation of said message generator, one of said pair of wires carrying both of said power and digital data signals and the second of said pair of wires connected to ground.

* * * * *